United States Patent
Krombach

[15] 3,698,330
[45] Oct. 17, 1972

[54] MECHANIC'S OVER-THE-ENGINE ACCESSIBILITY CARRIER

[72] Inventor: Thomas C. Krombach, 17 Saint Joan Lane, Cheektowaga, N.Y. 14227

[22] Filed: March 30, 1971

[21] Appl. No.: 129,405

[52] U.S. Cl. ................................................108/44
[51] Int. Cl. ..............................................A47b 23/00
[58] Field of Search..............108/50, 40, 44, 47, 129; 280/150, 153, 289

[56] References Cited

UNITED STATES PATENTS

| | | | |
|---|---|---|---|
| 2,611,417 | 9/1952 | Henry et al. | 108/129 X |
| 1,723,238 | 8/1929 | Hoot | 108/44 |
| 2,901,303 | 8/1959 | Anderson | 108/44 |
| 1,663,609 | 3/1928 | Peabody | 108/129 |
| 1,766,085 | 6/1930 | Rumer | 108/47 X |
| 2,805,778 | 9/1957 | Yordi | 108/44 |
| 3,015,530 | 1/1962 | Anderson | 108/44 |

*Primary Examiner*—Bobby R. Gay
*Assistant Examiner*—Glenn O. Finch
*Attorney*—Sommer & Weber

[57] ABSTRACT

A mechanic's over-the-engine accessibility carrier is adapted to be located over the engine compartment of a vehicle and to be supported on the adjoining fender portions thereof and is composed of a body supporting assembly adapted to be located over the engine and including an upper and elongated rigid platform provided with a head rest and a tool tray and a lower elongated supporting frame provided with longitudinal bearing shafts and lateral flanges, and four elongated telescopic leg assemblies adapted to extend laterally outwardly and downwardly from opposite sides of the body supporting assembly adjacent opposite ends thereof, with each leg assembly including a transverse sleeve at its inner end pivotally mounted on and adjustable longitudinally of the corresponding bearing shaft, a spring biased lever and detent device intermediate its ends for longitudinal adjustment thereof, an adjustable depending foot pad at its outer end and adapted to rest upon the underlying fender portion and a longitudinally adjustable stop including a wedge engageable between the underside of the corresponding lateral flange and the upperside of the inner end of the corresponding leg assembly for varying and limiting its outward pivotal movement about and longitudinal adjustment along the corresponding bearing shaft.

10 Claims, 10 Drawing Figures

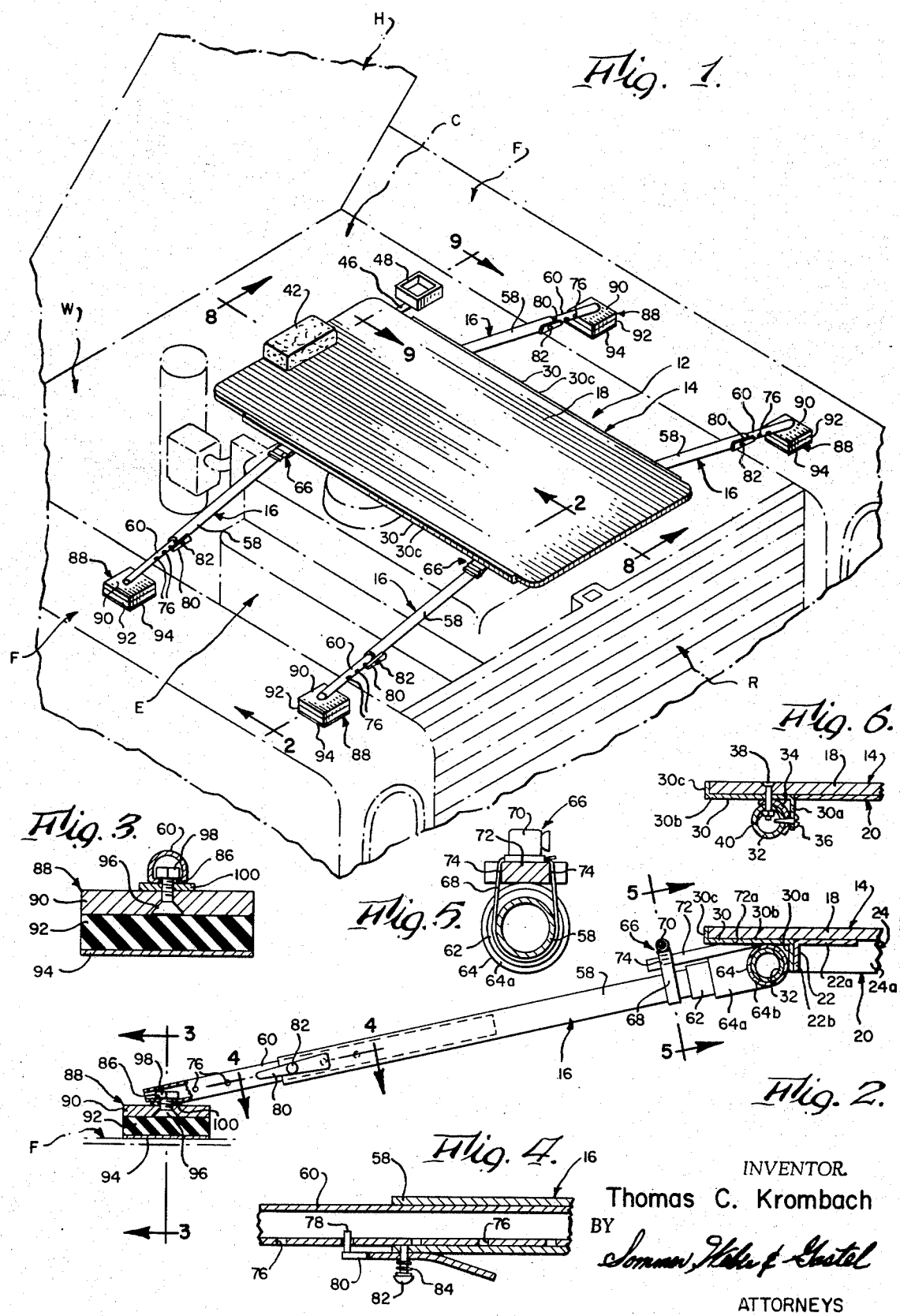

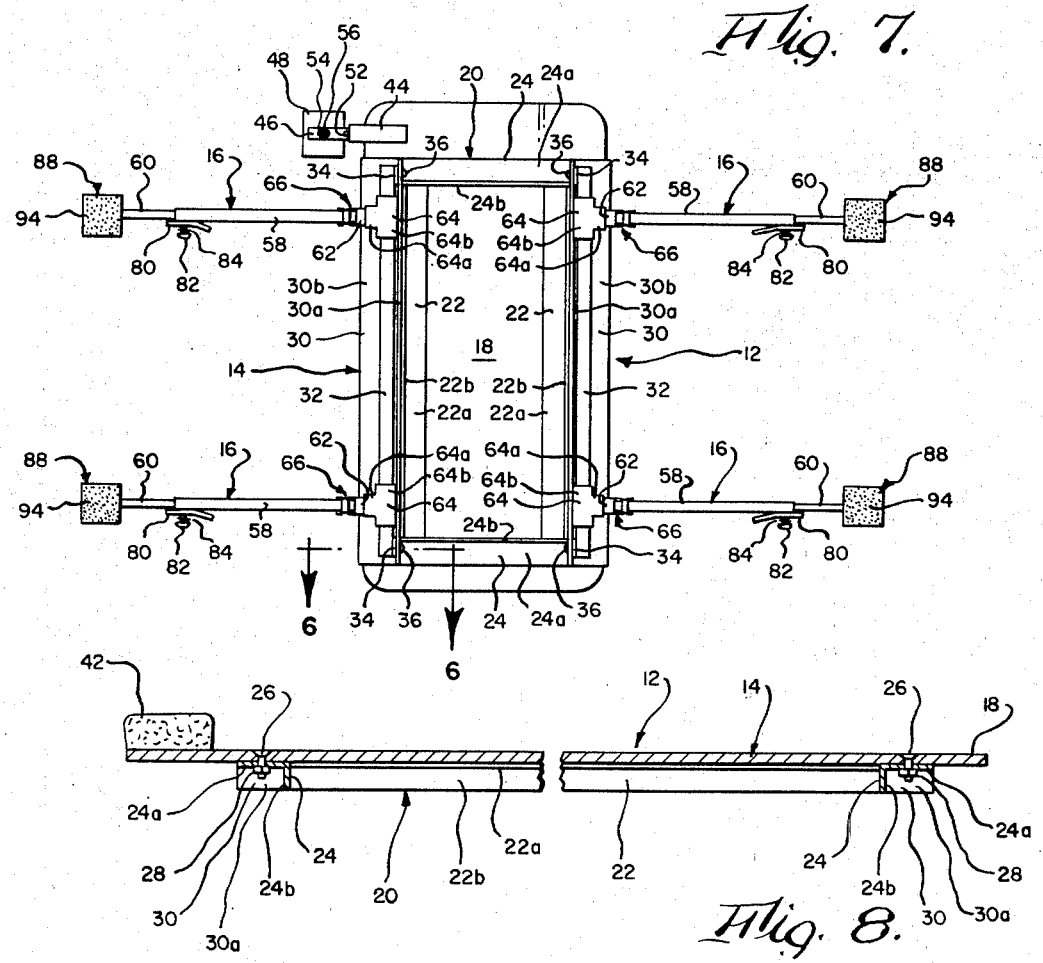
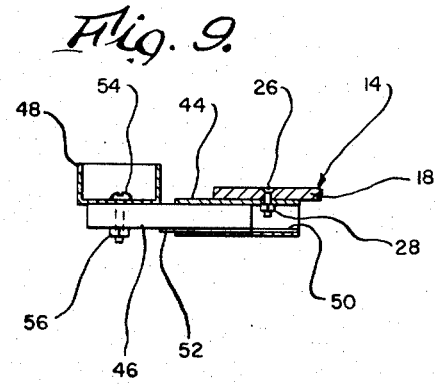
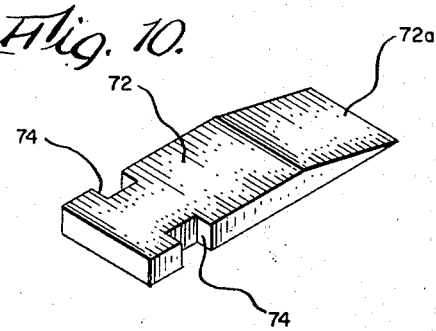
INVENTOR.
Thomas C. Krombach

MECHANIC'S OVER-THE-ENGINE ACCESSIBILITY CARRIER

This invention relates to improvements in mechanic's carriers for access to and repair of various components of a motor vehicle, and more particularly to a new and improved mechanic's over-the-engine accessibility carrier.

It, of course, is well known in the art to provide a mechanic's carrier in the form of a "dolly" composed of a platform mounted on rollers for supporting the back of a mechanic as he slides beneath the chassis of a motor vehicle for access to and repair of various components of the vehicle from below. However, when working on the various components of the engine compartment from above, it is necessary for the mechanic to lean over the fenders or radiator of the vehicle in order to work on the various engine components. This becomes particularly difficult and uncomfortable when working on the rear components of an engine, such as the back side of the carburetor, the distributor, intake manifold, p.c.v. valve, windshield wiper and heater motors, etc.

Accordingly, it is a primary object of the present invention to provide a mechanic's over-the-engine accessibility carrier which is arrangeable over the engine compartment of a vehicle and supportable on the adjoining fender portions thereof, all to provide a firm, comfortable and level support for the body of the mechanic at the proper height and facilitate access to and repair of the various engine components, particularly those located to the rear of the compartment, while relieving the mechanic of much of the discomfort and difficulty normally encountered. To this end, the inventive accessibility carrier comprises: a body supporting assembly locatable over the engine of the vehicle, and a plurality of elongated leg assemblies supportable laterally outwardly and downwardly from opposite sides of such body supporting assembly with each of such leg assemblies being pivotally connected at its inner end to the underside of the body supporting assembly, supportable at its outer end by the underlying fender portion of the vehicle and provided with adjustable stop means engageable between the underside of the body supporting assembly and the upper side of the inner end of the leg assembly for varying and limiting the outward pivotal movement of the leg assembly.

Another object is to provide such a carrier wherein the body supporting assembly is so constructed and designed that the mechanic's body is firmly yet comfortably supported by an upper elongated rigid body supporting platform and a lower elongated frame supporting such platform and including longitudinal bearing means pivotally mounting the inner ends of the leg assemblies and lateral flange means above such bearing means and having undersides engageable by the stop means.

A further object is to provide such a carrier wherein each of the leg assemblies is so constructed and designed that it readily accommodates itself to variations in the size and shape of engine compartments and contour of the adjoining fender portions for supporting the body supporting assembly in a level portion at the proper height by being longitudinally adjustable, having the upper side of its inner end engageable by such adjustable stop means and provided with transverse sleeve means pivotally mounted on the underside of the body supporting assembly and its outer end provided with adjustable foot means adapted to rest upon the underlying fender portion of the vehicle.

Still another object is to provide such a carrier wherein the body supporting assembly is so constructed and designed that the body supporting platform is provided at one end with means forming a head rest and means supporting a tool tray for the added comfort and convenience of the mechanic.

Additional objects and advantages of the invention will become apparent upon consideration of the following detailed description and accompanying drawings, wherein:

FIG. 1 is a front perspective view of the engine compartment of an automobile shown in broken lines and a preferred embodiment of the inventive mechanic's over-the-engine accessibility carrier shown in solid lines in an operative position over the engine compartment;

FIG. 2 is an enlarged section taken on line 2—2 of FIG. 1 and showing structural details of one of the telescopic leg assemblies and its pivotal connection to the body supporting assembly of the inventive carrier;

FIG. 3 is an enlarged section taken on line 3—3 of FIG. 2 and showing structural details of an adjustable foot pad on the outer end of such leg assembly;

FIG. 4 is an enlarged section taken on line 4—4 of FIG. 2 and showing the telescopic relationship between the inner and outer legs of such leg assembly as well as the spring biased lever device for adjusting such legs longitudinally;

FIG. 5 is an enlarged section taken on line 5—5 of FIG. 2 and showing structural details of the adjustable stop for varying and limiting the outward pivotal movement of such leg assembly;

FIG. 6 is an enlarged section taken on line 6—6 of FIG. 7 and showing the mounting of one of the longitudinal bearings at one end of the frame of the body supporting assembly;

FIG. 7 is a bottom plan view of the carrier of FIG. 1 and showing details of the lower frame supporting the upper platform of the body supporting assembly as well as the mounting of the leg assemblies on the longitudinal bearings of such body supporting assembly;

FIG. 8 is an enlarged section taken on line 8—8 of FIG. 1 and showing the fastening of the upper platform on the lower frame of the body supporting assembly as well as the head rest on one end of the platform;

FIG. 9 is an enlarged section taken on line 9—9 of FIG. 1 and showing the longitudinally and pivotally adjustable tracks swingably supporting a tool tray adjacent one end of the platform, and FIG. 10 is an enlarged perspective view of the wedge of the stop shown in FIGS. 2 and 5.

Referring to the drawings, and particularly FIG. 1, the front portion of a motor vehicle in the form of an automobile is shown in broken lines with the engine compartment being generally indicated at C and defined along each side by fender portions F and at the front end by radiator R and fire wall W respectively. Compartment C is closable at the top by hood H, which is shown in the open position. The engine and its various components which are contained within compartment C are generally indicated at E.

A mechanic's over-the-engine accessibility carrier constituting a preferred embodiment of the present invention is generally indicated at 12 and is shown in an operative position arranged over the engine compartment C and supported on the adjoining fender portions F. The inventive carrier 12 is composed of a body supporting assembly generally indicated at 14 and four elongated leg assemblies generally indicated at 16. In the operative position shown, body supporting assembly 14 is located over the engine, while leg assemblies 16 extend outwardly and downwardly from opposite ends thereof, with each leg assembly being pivotally connected at its inner end to the underside of the body supporting assembly and supported at its outer end by the underlying fender portion F of the vehicle.

Body supporting assembly 14 basically is composed of an upper elongated and rectangular, rigid and preferably flat body supporting platform 18, which may be made of any suitable material such as plywood, plastic or the like and a lower hollow rectangular frame 20 supporting platform 18 from beneath, as best shown in FIGS. 7 and 8. Frame 20, which preferably is made of suitable metal components, basically is composed of two elongated longitudinal angle members 22 extending along the bottom of platform 18 inboard of the side edges thereof and arranged with their horizontal flanges 22a extending inwardly and their vertical flanges 22b depending downwardly. At their opposite ends, longitudinal angle members 22 are spanned by shorter transverse angle members 24 which are arranged with their horizontal flanges 24a extending outwardly and their vertical flanges 24b depending downwardly. If desired, these longitudinal and transverse angle members may be welded together, and platform 18 is secured at least to the outstanding horizontal flanges 24a of angle members 24 by means of countersunk bolts 26 and nuts 28, although platform 18 also could be secured similarly to the horizontal flanges 22a of longitudinal angle members 22, if desired.

As also seen in FIG. 6, frame 20 includes a pair of elongated double angle members 30 of Z-shaped cross section projecting beyond members 22 at each end. The depending inner flanges 30a of members 30 preferably are suitably secured to the depending flanges 22b of longitudinal angle members 22 and/or the end of transverse members 24, such as by welding or the like, with the laterally outstanding horizontal flanges 30b of members 30 supporting the outboard side marginal portions of platform 18 and terminating in relatively short upstanding flanges 30c protecting the outboard side edges of the platform. As will be described in detail later, the undersides of the outstanding lateral flanges 30b of frame members 30 are engageable by adjustable stop means for varying and limiting the outward pivotal movement of leg assemblies 16, as well as their longitudinal adjustment along the frame.

Continuing with FIGS. 6 and 7, frame 20 also includes a pair of elongated and longitudinal, round and hollow, tubular bearing shafts 32 which are supported in spaced relationship to frame members 30, i.e., spaced below outstanding lateral flanges 30b and laterally outwardly of depending flanges 30a. This mounting is accomplished by arcuate spacers 34 arranged beyond the outer ends of inner longitudinal angle members 22 and secured between the outer ends of tubular bearing shafts 32 and flanges 30b by means of screws 36 extending through depending flanges 30a, spacers 34 and into shafts 32, as well as by elongated countersunk bolts 38 extending downwardly through platform 18, horizontal flanges 30b, spacers 34 and into tubular bearing shafts 32, such bolts being held in place by nuts 40. As will be seen below, this spaced mounting of longitudinal bearing shafts 32 is required for the desired pivotal and longitudinally adjustable mounting of leg assemblies 16 thereon and also prevents removal of the latter.

Continuing with FIGS. 1 and 7–9, one end of platform 18 preferably is provided on its upper side with a cushion 42 forming a head rest and suitably secured in place, as by an adhesive. In addition, such one end of platform 18 preferably is provided on its underside with longitudinally and pivotally adjustable tracks 44, 46 swingably supporting a tool tray 48 adjacent such platform. Inner fixed track 44 is of square hollow cross-section and is pivotally secured in place by countersunk bolt 26 extending through platform 18 and the upper side of the track and by nut 28, for swinging the tool tray to the lateral position shown or to various other convenient positions, such as one perpendicular thereto. Track 44 also is provided on its underside with a central internal longitudinal guide slot 50 engageable by the depending central longitudinal spline or boss 52 provided along the underside of outer movable track 46, which likewise is of hollow square cross-section and telescopes into and out of track 44. Tool tray 48 is secured in place on the outer end of track 46 by elongated bolt 54 extending through the track and by nut 56.

This headrest and tool tray structure complete the body supporting assembly 14 and appreciably add to the comfort and convenience of the mechanic, particularly as he works on the rear engine components. Thus, not only is the body of the mechanic adequately and firmly supported by platform 18, but also headrest 42 provides a cushion for his head while permitting him freedom to work on such rear engine components. In addition, tool tray 48 and its supporting track structure provide convenient access to his tools.

Turning now to FIG. 2, each leg assembly 16 is composed of telescopic inner and outer end legs 58, 60 respectively, with each leg preferably being of hollow round tubular cross section and with outer leg 60 being telescopically nested within inner leg 58 for the desired longitudinal adjustment thereof. At its inner end, inner leg 58 is provided with a cylindrical adapter 62, which in turn is threaded into the cylindrical down leg 64a of a hollow tubular tee 64, the cylindrical cross bar of which forms a sleeve 64b surrounding and being pivotally mounted on the adjacent longitudinal bearing shaft 32. As will be evident, sleeves 64a preferably are assembled over bearing shafts 32 prior to installation of the shafts on frame 20 and such sleeves are longitudinally adjustable along such shafts for varying the distance between leg assemblies 16 on each side of body supporting assembly 14, with accidental removal of sleeves 64a being prevented by spacers 34 located beyond the sleeves.

Continuing with FIG. 2, in order to vary and limit the outer pivotal movement of each leg assembly 16 about shaft 32, as well as its longitudinal adjustment along the shaft, the inner end of inner leg 58 is provided with a longitudinally adjustable stop generally indicated at 66. This stop includes a clamp which is composed of an elongated metal strap 68 surrounding the inner end of leg 58 and having its upper serrated ends overlapped through the lower end of a turn screw device 70 for tightening or loosening the strap, and an elongated wedge 72 having adjacent its rear end slots or notches 74 in its sides and through which pass the upper reaches of strap 68. At its front end wedge 72 is provided with an upper and outwardly tapered surface 72a which is adapted to be engaged between the underside of the outstanding lateral flange 30b of frame member 30 and the upper side of the down leg 64a of tee 64 on the inner end of leg 58. In the position shown in FIG. 2, stop 66 is adjusted so that wedge 72 is in its innermost position, whereby leg assembly 16 is inclined downwardly and outwardly at an angle of about 12° to the horizontal, which is more than adequate for clearance of the various engine components. By loosening screw device 70 to stop 66 and completely removing wedge 72, leg assembly 16 can move to the horizontal position, wherein the upper side of the down leg 64a of sleeve 64 engages the underside of outstanding flange 30a. By adjusting stop 66 between these two extreme positions, the operative angular position of leg assembly 16 can be so varied. For example, with the stop 66 adjusted so that only about half of the tapered surface 72a of wedge 72 engages beneath lateral flange 30b, leg assembly 16 can be adjusted upwardly to about 5° below horizontal. As will be evident, with an individual stop 66 and wedge 72 provided for each leg assembly 16, the latter can be individually adjusted so that platform 18 is at the desired level and preferably horizontal position, notwithstanding variations in the heights of different fender portions F. Of course, for storage purposes leg assemblies 16 readily can be telescoped to their shortest length and pivoted under frame 20, or legs 58,60 even may be removed from tees 64, if desired.

Continuing with FIGS. 2-4, outer leg 60 of each leg assembly 16 is provided along one side with a plurality of longitudinally spaced recesses in the form of through holes 76 which are selectively engageable with laterally extending detent 78 on one end of a lever 80, the opposite end of which is inclined outwardly away from upper leg 58, with the lever being mounted on such upper leg by a headed pin 82 extending through the central portion of the lever and force fit into upper leg 58, with the lever being normally biased to the engaged position shown in FIG. 4 by a compression spring 84 surrounding pin 82. In order to adjust the length of each leg assembly 16, it is merely necessary for the mechanic to depress the outwardly inclined free end of lever 80 to pivot the lever against the bias of spring 84 and disengage detent 78 from one recess 76, slide leg 60 into or out of leg 58 until the desired length is reached and release lever 80, whereby spring 84 automatically biases detent 78 into the corresponding hole 76 in outer leg 60. Such individual longitudinal adjustment of each leg assembly 16 also assists in properly supporting the leg assemblies on the fender portions F, not only for various widths of engine compartments C, but also for varying elevations of fender portions F so that body supporting assembly 14 will be at the desired level and preferably horizontal position shown.

At its outer end, outer leg 60 is open but is flattened on its underside to provide a through opening 86 for attachment to an adjustable depending foot pad generally indicated at 88. This foot pad preferably is composed of an upper laminate 90 preferably formed of wood, plastic or other suitable rigid material, a lower laminate 92 which also may be formed of the same or a resilient material such as rubber, and a lowermost lining 94 which may be formed of suitable soft material such as felt or the like. In assembling foot pad 88 to outer leg 60, the exposed threaded stem portion of countersunk bolt 96 embedded in laminate 90 is inserted through the opening 86 in the underside of outer leg 60 and is held loosely in place by nut 98 which is insertable through the open end of the leg. In addition, a washer 100 may be provided between the underside of leg 60 and the upper side of upper laminate 90 of foot pad 88 surrounding bolt 96.

As is evident from FIG. 3, a "loose" or "sloppy" connection is formed between foot pad 88 and the outer end of outer leg 60 so that the adjustable depending foot pad readily will conform to variations in contour of the upper surface of underlying fender portion F. Once again, this adjustability of foot pad 88 also contributes to the proper level positioning of body supporting assembly 14.

It will now be seen how the aforedescribed invention accomplishes its various objectives, and numerous advantages thereof will likewise be apparent. While the invention has been described and illustrated herein by reference to a single preferred embodiment, this is to be considered as illustrating rather than limiting the scope of the invention which is to be determined from the appended claims.

What is claimed is:

1. A mechanic's over-the-engine accessibility carrier arrangeable over the engine compartment of a vehicle and supportable on the adjoining fender portions thereof, wherein the improvement comprises a body supporting assembly locatable over the engine of the vehicle, and a plurality of elongated leg assemblies supportable extendible laterally outwardly and downwardly from opposite sides of said body supporting assembly, with each of said leg assemblies being pivotally connected at its inner end to the underside of said body supporting assembly supportable at its outer end by the underlying fender portion of the vehicle and provided with adjustable stop means engageable between the underside of said body supporting assembly and the upper side of said inner end of said leg assembly for varying and limiting the outward pivotal movement of said leg assembly.

2. The carrier of claim 1 wherein said body supporting assembly includes an upper elongated rigid body supporting platform, and a lower elongated frame supporting said platform and including bearing means pivotally mounting said inner ends of said leg assemblies and lateral flange means above said bearing means and having undersides engageable by said stop means.

3. The carrier of claim 1 wherein each of said leg assemblies is longitudinally adjustable, has the upper side of its inner end engageable by said stop means and provided with transverse sleeve means pivotally mounted on the underside of said body supporting assembly and its outer end provided with adjustable foot means adapted to rest upon the underlying fender portion of the vehicle.

4. The carrier of claim 3 wherein said body supporting assembly includes an upper elongated rigid body supporting platform, and a lower elongated frame supporting said platform and including bearing means pivotally mounting said sleeve means and lateral flange means above said bearing means and having undersides engageable by said stop means.

5. The carrier of claim 4 wherein said platform is provided at one end with means forming a headrest and means supporting a tool tray.

6. The carrier of claim 1 wherein said body supporting assembly includes an upper elongated and generally rectangular, rigid body supporting platform, and a lower elongated and generally rectangular frame supporting said platform and including along opposite sides elongated and longitudinal, round bearing shafts pivotally mounting the inner ends of said leg assemblies, outstanding lateral flanges spaced above said bearing shafts and having undersides engageable by said stop means, depending flanges spaced inwardly from said bearing shafts and spacers secured between said flanges and bearing shafts.

7. The carrier of claim 1 wherein each of said leg assemblies includes inner and outer telescopic legs with said outer leg being telescopically nested in said inner leg and provided with longitudinally spaced recesses therein, a spring biased lever movably mounted on the outer end of said inner leg and having a detent resiliently urged into one of said recesses for adjusting said legs longitudinally, the upper side of the inner end of said inner leg being engageable by said stop means and provided with a hollow round transverse sleeve pivotally mounted on and adjustable longitudinally of the underside of said body supporting assembly, and a depending foot pad adjustably mounted on the outer end of said outer leg and adapted to rest upon the underlying fender portion of the vehicle.

8. The carrier of claim 7 wherein said body supporting assembly includes an upper elongated and generally rectangular, rigid body supporting platform, and a lower elongated and generally rectangular frame supporting said platform and including along opposite sides elongated and longitudinal, round bearing shafts on which said longitudinally adjustable sleeves are pivotally mounted, outstanding lateral flanges spaced above said bearing shafts and having undersides engageable by said stop means, depending flanges spaced inwardly from said bearing shafts and spacers secured between said flanges and bearing shafts beyond said sleeves.

9. The carrier of claim 8 wherein said each of said stop means includes a wedge engageable between the upper side of said inner end of said inner leg and the underside of said outstanding lateral flange and an adjustable clamp surrounding said inner leg for moving said wedge longitudinally of said inner leg for varying and limiting its outward pivotal movement about and longitudinal adjustment along said bearing shaft.

10. The carrier of claim 9 wherein one end of said platform is provided on its upper side with a cushion forming a headrest and on its underside with longitudinally and pivotally adjustable tracks swingably supporting a tool tray adjacent said platform.

* * * * *

UNITED STATES PATENT OFFICE
CERTIFICATE OF CORRECTION

Patent No. 3,698,330  Dated October 17, 1972

Inventor(s) Thomas C. Krombach

It is certified that error appears in the above-identified patent and that said Letters Patent are hereby corrected as shown below:

Column 1, lines 35 and 36, "supportable" should be --extendible--.

Column 5, line 25, "to" should be --of--.

Claim 1, Column 6, lines 47 and 48, delete the word --supportable--.

Signed and sealed this 6th day of March 1973.

(SEAL)
Attest:

EDWARD M. FLETCHER, JR.
Attesting Officer

ROBERT GOTTSCHALK
Commissioner of Patents